(12) United States Patent
Hasegawa

(10) Patent No.: US 12,514,795 B2
(45) Date of Patent: Jan. 6, 2026

(54) GLYCERIN DISPERSION AND COSMETIC

(71) Applicant: MIYOSHI KASEI, INC., Tokyo (JP)

(72) Inventor: Yukio Hasegawa, Tokyo (JP)

(73) Assignee: MIYOSHI KASEI, INC., Tokyo (JP)

( * ) Notice: Subject to any disclaimer, the term of this patent is extended or adjusted under 35 U.S.C. 154(b) by 818 days.

(21) Appl. No.: 17/776,726

(22) PCT Filed: Nov. 12, 2020

(86) PCT No.: PCT/JP2020/042243
§ 371 (c)(1),
(2) Date: May 13, 2022

(87) PCT Pub. No.: WO2021/100600
PCT Pub. Date: May 27, 2021

(65) Prior Publication Data
US 2022/0387270 A1    Dec. 8, 2022

(30) Foreign Application Priority Data

Nov. 21, 2019 (JP) ................. 2019-210425

(51) Int. Cl.
| | |
|---|---|
| *A61K 8/19* | (2006.01) |
| *A61K 8/04* | (2006.01) |
| *A61K 8/25* | (2006.01) |
| *A61K 8/34* | (2006.01) |
| *A61K 8/44* | (2006.01) |
| *A61K 8/81* | (2006.01) |
| *A61K 8/87* | (2006.01) |
| *A61K 8/92* | (2006.01) |

(52) U.S. Cl.
CPC ............... *A61K 8/19* (2013.01); *A61K 8/04* (2013.01); *A61K 8/25* (2013.01); *A61K 8/345* (2013.01); *A61K 8/44* (2013.01); *A61K 8/81* (2013.01); *A61K 8/87* (2013.01); *A61K 8/92* (2013.01); *A61K 2800/5422* (2013.01); *A61K 2800/622* (2013.01)

(58) Field of Classification Search
None
See application file for complete search history.

(56) References Cited

U.S. PATENT DOCUMENTS

| | | |
|---|---|---|
| 2011/0110995 A1 | 5/2011 | Hasegawa et al. |
| 2013/0056566 A1 | 3/2013 | Guillot et al. |
| 2015/0216785 A1* | 8/2015 | Antwi .................... A61K 8/732 |
| | | 514/60 |
| 2015/0376415 A1 | 12/2015 | Guillot et al. |
| 2017/0209522 A1* | 7/2017 | Haga ........................ A61K 8/34 |
| 2018/0133199 A1* | 5/2018 | Dellamary ........... A61K 31/444 |
| 2019/0053999 A1* | 2/2019 | Hori ....................... A61Q 19/00 |

FOREIGN PATENT DOCUMENTS

| | | | | |
|---|---|---|---|---|
| EP | 2289484 A1 | * | 3/2011 | ........... C09C 1/0021 |
| JP | 2002188024 A | * | 7/2002 | |
| JP | 2016-108317 A | | 6/2016 | |
| JP | 2017-137252 A | | 8/2017 | |
| JP | 2017-210460 A | | 11/2017 | |
| JP | 2017-226610 A | | 12/2017 | |
| JP | 2018-168141 A | | 11/2018 | |
| JP | 2018-203624 A | | 12/2018 | |
| JP | 2019-099480 A | | 6/2019 | |

OTHER PUBLICATIONS

Machine translation for JP-2002188024-A. (Year: 2002).*
Extended (Supplementary)European Search Report dated Nov. 28, 2023, issued in counterpart EP Application No. 20889207.5. (12 pages).
International Search Report dated Jan. 12, 2021, issued in counterpart International Application No. PCT/JP2020/042243. (2 pages).

* cited by examiner

*Primary Examiner* — Carlos A Azpuru
*Assistant Examiner* — Casey S Hagopian
(74) *Attorney, Agent, or Firm* — WHDA, LLP

(57) ABSTRACT

Provided are: a glycerin dispersion in which the dispersibility and storage stability of a hydrophobized inorganic powder are improved; and a cosmetic containing the glycerin dispersion. A glycerin dispersion containing a hydrophobized inorganic powder, in which an inorganic powder is used as a base and hydrophobicity is imparted by coating the inorganic powder with an organic surface treatment agent, a polyglycerin-based nonionic surfactant, and glycerin is provided.

4 Claims, No Drawings

GLYCERIN DISPERSION AND COSMETIC

FIELD

The present invention relates to a glycerin dispersion and a cosmetic. In particular, the present invention relates to a glycerin dispersion containing a hydrophobized inorganic powder, a polyglycerin-based nonionic surfactant, and glycerin, and a cosmetic obtained by blending the glycerin dispersion.

BACKGROUND

In a cosmetic, a color pigment or a UV scattering agent containing an inorganic powder such as zinc oxide, titanium oxide, or iron oxide as a base material is blended, but the inorganic powder itself shows strong aggregability, and gives a powdery sensation and physical irritation to the skin, and also has poor smoothness on the skin and poor adhesiveness or adhesion to the skin. For the purpose of improving these, the inorganic powder to be blended in a cosmetic is subjected to a hydrophobization surface treatment with various organic compounds, and is blended as a hydrophobized inorganic powder.

Further, a hydrophobized inorganic powder is generally blended in an oil layer in a water and oil emulsion-type cosmetic, but there are many demands for also blending a hydrophobized inorganic powder in an aqueous layer to further exhibit the effect of the cosmetic, or to add a new function in recent years. In order to achieve the demands, a composition in which an inorganic powder which is not subjected to a hydrophobization treatment is dispersed in water or a polyol, or a dispersion composition in which an inorganic powder subjected to a hydrophobization treatment is blended at a high concentration of 50 wt % or more have been proposed. An inorganic pigment which is not subjected to a hydrophobization treatment releases metal ions when it comes in contact with water, and therefore, powder particles aggregate during a dispersion step and a phenomenon of thickening of a dispersion occurs, and thus, it is difficult to obtain a uniform dispersion composition. It also affects the stability of the composition over time after dispersion, and stabilization over time is also difficult. On the other hand, when the inorganic powder subjected to a hydrophobization treatment is dispersed in water or a polyol, the surfaces of the powder particles are lipophilic, and therefore, the affinity for water is poor, and the lipophilic particles are wetted with a hydrophilic surfactant to form a dispersion composition, however, the current state is that precipitation occurs over time due to the difference in specific gravity between the solvent and the inorganic powder and it is difficult to obtain stability. As the dispersion composition in the polyol, one using 1,3-butylene glycol as a dispersion medium is disclosed, but 1,3-butylene glycol functions as a preservative, and there is a voluntary restriction on the blending amount thereof in a cosmetic from the viewpoint of irritation to the skin or eyes. Glycerin is highly safe among the polyols, and has a high moisturizing property, and therefore, its application to a leave-on cosmetic is more preferred. There is no dispersion composition, in which a hydrophobized inorganic powder is contained at a high concentration and only glycerin is used as a dispersion medium without blending water, and which has excellent stability over time and flows. In other words, for the purpose of enhancing the dispersibility of a hydrophobized inorganic powder and enhancing the stability over time in a dispersed state, a nonionic surfactant and a polyhydric alcohol are blended in a cosmetic.

For example, Patent Literatures (PTLs) 1 to 3 disclose a liquid dispersion containing a hydrophobized inorganic powder, a nonionic surfactant, and a polyhydric alcohol (for example, 1,3-butylene glycol).

[PTL 1] JP2017-137252A
[PTL 2] JP2016-108317A
[PTL 3] JP2017-210460A

SUMMARY

The following analysis was conducted from the viewpoint of the present invention. The disclosure of the respective above prior art documents shall be incorporated into this document by citation.

The dispersibility and storage stability of the hydrophobized inorganic

The dispersibility and storage stability of the hydrophobized inorganic powder in the liquid dispersion of Patent Literatures (PTLs) 1 to 3 are not yet sufficient, and in order to improve the properties such as a chromogenic property, transparency, and a UV shielding ability of the hydrophobized inorganic powder, there is a problem to be solved. That is, an object of the present invention is to provide a dispersion in which the dispersibility and storage stability of a hydrophobized inorganic powder are improved.

According to a first aspect of the present invention, a glycerin dispersion containing a hydrophobized inorganic powder, in which an inorganic powder is used as a base and hydrophobicity is imparted by coating the inorganic powder with an organic surface treatment agent, a polyglycerin-based nonionic surfactant, and glycerin is provided.

In the first aspect, it is preferred that an alkyl group in the polyglycerin-based nonionic surfactant has 10 to 14 carbon atoms.

In the first aspect, it is preferred that the organic surface treatment agent is one or more types of compounds selected from a silicone compound, an alkyl silane, an alkyl titanate, an acylated amino acid, a fatty acid, lecithin, an ester oil, an acrylic polymer, and a urethane polymer.

In the first aspect, it is preferred that the content of the hydrophobized inorganic powder is 50 wt % or more.

According to a second aspect of the present invention, a cosmetic including the glycerin dispersion of the present invention as an aqueous layer component is provided.

According to each aspect of the present invention, a glycerin dispersion in which the dispersibility and storage stability of a hydrophobized inorganic powder are improved, and a cosmetic containing the glycerin dispersion are provided.

PREFERRED MODES

First, terms used in the present application will be explained.

[Hydrophobized Inorganic Powder: Component (A)]

The hydrophobized inorganic powder is a powder in which an inorganic powder is used as a base and hydrophobicity is imparted by coating the inorganic powder with an organic surface treatment agent. As an evaluation method for hydrophobicity, 100 cc of purified water is placed in a 200 cc glass beaker, and 0.2 g of a powder taken out with a spatula is dropped onto the surface of water from a height of 2 cm above the surface of water, followed by stirring 50 times at a rate of twice per second with the spatula, and then, the beaker is left to stand for 30 seconds. A powder in which the powder particles float without transferring to the aqueous layer when observation in the water is performed is preferred.

The inorganic powder as the base is not particularly limited as long as it is an inorganic powder to be generally used for cosmetics. Examples thereof include sericite, natural mica, calcined mica, synthetic mica, synthetic sericite, alumina, mica, talc, kaolin, bentonite, smectite, calcium carbonate, magnesium carbonate, magnesium silicate, aluminum silicate, calcium phosphate, silicic anhydride, magnesium oxide, barium sulfate, magnesium aluminometasilicate, iron oxide, chromium oxide, titanium oxide, zinc oxide, cerium oxide, aluminum oxide, magnesium oxide, Prussian blue, ultramarine, aluminum hydroxide, magnesium sulfate, silicic acid, magnesium aluminum silicate, calcium silicate, barium silicate, strontium silicate, silicon carbide, a metal tungstate, magnesium aluminate, chlorohydroxyaluminum, clay, zeolite, hydroxyapatite, a ceramic powder, aluminum nitride, silicon carbide, cobalt titanate, lithium cobalt titanate, cobalt aluminate, an inorganic blue pigment, low-order titanium oxide, fine particle titanium oxide, butterfly-shaped barium sulfate, petal-shaped zinc oxide, hexagonal plate-shaped zinc oxide, tetrapot-shaped zinc oxide, fine particle zinc oxide, titanium oxide-coated mica, titanium oxide-coated silica, titanium oxide-coated synthetic mica, titanium oxide-coated talc, fish scale foil, titanium oxide-coated colored mica, titanium oxide-coated borosilicate (sodium/calcium), titanium oxide-coated borosilicate (calcium/aluminum), red iron oxide-coated mica, red iron oxide-coated mica titanium, red iron oxide/black iron oxide-coated mica titanium, carmine-coated mica titanium, carmine/Prussian blue-coated mica titanium, mango violet, cobalt violet, a glass fiber, an alumina fiber, and the like.

The inorganic powder is preferably a powder composed of particles of a metal oxide or a metal hydroxide containing at least one of Ti, Zn, Si, Al, Fe, Mg, and Ce. Examples of such an inorganic powder include titanium oxide, zinc oxide, silica, aluminum oxide, iron oxide, iron hydroxide, magnesium oxide, calcium carbonate, cerium oxide, and the like. The inorganic oxide powder particles may be coated with another oxide or hydroxide.

As the organic surface treatment agent, one or more types of compounds selected from a silicone compound, an alkyl silane, an alkyl titanate, a polyolefin, an acylated amino acid, a fatty acid, lecithin, an ester oil, a fructooligosaccharide, an acrylic polymer, and a urethane polymer are exemplified.

As the silicone compound, methyl hydrogen polysiloxane (Shin-Etsu Chemical Co., Ltd.: KF99P, KF9901, X-24-9171, X-24-9221, or the like), dimethiconol, one-terminal alkoxysilyl dimethylpolysiloxane, trimethylsiloxysilicate, a cyclic methylhydrogen silicone such as tetra hydro tetra methyl cyclo tetra siloxane, an acrylic silicone, a silicone acrylic, an amino-modified silicone, a carboxy-modified silicone, a phosphate-modified silicone, or the like can also be used. Other than these, as a commercially available one from Shin-Etsu Chemical Co., Ltd., KF-9908 (triethoxysilylethyl poly dimethylsiloxy ethyl dimethicone), KF-9909 (triethoxysilylethyl poly dimethylsiloxy ethyl hexyl dimethicone), or the like can also be used.

Examples of the alkyl silane include an alkyl alkoxy silane. Examples of the length of the alkyl chain include 1 to 18 carbon atoms, and specific examples thereof include methyltriethoxysilane, octyltriethoxysilane, octadecyltriethoxysilane, aminopropyltriethoxysilane, and the like.

As the alkyl titanate, a compound having a $Ti(OR_1)_4$ structure as a basic skeleton, wherein $R_1$'s are independently an alkyl group or an organic carbonyl group is exemplified.

As a commercially available one, isopropyl triisostearoyl titanate (Plenact TTS; Ajinomoto Fine-Techno Co., Inc.), and the like are exemplified.

As the polyolefin, polyolefin resins having at least one carboxyl group in the molecule such as polyethylene and polypropylene can be exemplified. For example, low molecular weight polyethylene which is a known compound described in JP-A-63-179972 and has a molecular weight of 500 to 40,000 and a melting point of 40° C. or higher, polyethylene oxide obtained by oxidizing polypropylene, maleated polyethylene, polypropylene oxide, and the like are exemplified.

The acylated amino acid may be an acylated compound of a saturated fatty acid having 12 or more and 18 or less carbon atoms and an amino acid selected from aspartic acid, glutamic acid, alanine, glycine, sarcosine, proline, and hydroxyproline, or one which is a total hydrolysate such as a peptide derived from a plant such as wheat or peas, a silk peptide, or a peptide derived from an animal, and in which the carboxyl group of the amino acid may be in a free form or in the form of a salt of K, Na, Fe, Zn, Ca, Mg, Al, Zr, Ti, or the like. Specifically, Amisoft CS-11, CS-22, MS-11, HS-11P, HS-21P, etc., which are commercially available from Ajinomoto Co., Inc., Soypon SLP, Soypon SCA, and Alanon AMP, which are commercially available from Kawaken Fine Chemicals, Co., Ltd., SEPILIFT DPHP, etc., which are commercially available from France SEPPIC Company, and Sarcosinate MN, etc., which are commercially available from Nikko Chemical Co., Ltd. can be exemplified. The acylated amino acids may be in the form of a composition with a fatty acid. Examples of an acylated lipoamino acid composition include SEPIFEEL ONE (a composition composed of four components of palmitoyl proline, palmitoyl sarcosine, palmitoyl glutamate, and palmitic acid) commercially available from SEPPIC Company.

As the fatty acid, a linear or branched saturated or unsaturated fatty acid having 12 to 22 carbon atoms, for example, a fatty acid such as lauric acid, myristic acid, palmitic acid, stearic acid, oleic acid, linoleic acid, palmitoleic acid, behenic acid, lignoceric acid, 2-ethylhexanoic acid, isotridecanoic acid, isomyristic acid, isopalmitic acid, isostearic acid, or isobehenic acid, or a metal salt of Ca, Mg, Zn, Zr, Al, Ti, or the like is exemplified.

As the lecithin, natural lecithin extracted from egg yolk, soybeans, corns, rapeseed, sunflower, or the like, and a glyceride which is obtained by hydrogenating synthetic lecithin and is hydrogenated lecithin having an iodine value of 15 or less and has a phosphate group are exemplified. Examples of the lecithin in the form of a salt include water-insoluble hydrogenated lecithin metal salts of Al, Mg, Ca, Zn, Zr, Ti, or the like.

The ester oil includes an acidic ester compound having 16 or more carbon atoms in total, which can be obtained by allowing one type or two or more types of alcohols having 1 to 36 carbon atoms to react with one type or two or more types of carboxylic acids having 1 to 36 carbon atoms, and a compound having an acid value of 15 or more is preferred. Known compounds described in JP-A-2004-51945, and specifically, Salacos MIS (isostearyl sebacate), Salacos MOD (octyldodecanol azelate), Salacos 1A (octyldodecanol adipate), and Salacos HD (octyldodecanol dimerate), which are commercially available from Nisshin Oillio Group, Ltd., and the like are exemplified.

Further, as the ester oil, a dextrin fatty acid ester is also exemplified, and the fructooligosaccharide can be selected from esters composed of a dextrin or a fructooligosaccharide and a fatty acid, or derivatives thereof. Specifically, for example, Rheopearl KL, Rheopearl MKL, Rheopearl TT, Rheopearl KE, Rheopearl TL, and Rheopearl ISK, which are known compounds described in JP-B-5-3844 and JP-A-2002-188024 and commercially available from Chiba Flour Milling Co., Ltd., and the like are exemplified.

As the acrylic polymer, a copolymer of one or more types of monomers composed of acrylic acid or methacrylic acid and an alkyl acrylate is exemplified. As an INCI name, an (acrylate/(C10-30) alkyl acrylate) crosspolymer, an (acrylate/behenes-25 methacrylate) copolymer, an (acrylate/steareth-20 methacrylate) crosspolymer, and the like are exemplified.

As the urethane polymer, a polymer having a hydrophilic group moiety of a polyurethane skeleton and having a hydrophobic moiety in the molecule is exemplified. As an INCI name, a (PEG-240/decyltetradeceth-20/HDI) copolymer (ADEKA NOL GT-700; ADEKA Corporation), a bis-stearyl PEG/PPG-8/6 (SMDI/PEG-400) copolymer (Aqupec HU C2002; Sumitomo Seika Chemicals Company, Limited), and the like are exemplified.

A method for producing the hydrophobized inorganic powder is not particularly limited, and the production may be performed by mixing an organic surface treatment agent and an inorganic powder. The mixing method is also not particularly limited, and a mixing machine capable of uniformly performing the treatment may be adopted. For example, a Henschel mixer, a ribbon blender, a kneader, an extruder, a disper mixer, a homomixer, a bead mill, and the like are exemplified. By performing drying with a hot air dryer, a spray dryer, a flash dryer, a conical dryer, or the like after mixing, the hydrophobized inorganic powder can be obtained.

As the hydrophobized inorganic powder, one type or two or more types can be blended in a cosmetic.

[Polyglycerin (PG)-Based Nonionic Surfactant: Component (B)]

A polyglycerin-based nonionic surfactant (nonionic surfactant) is a surfactant in which polyglycerin (PG) as a hydrophilic moiety and an alkyl group as a lipophilic moiety are bonded through an ether bond or an ester bond. The alkyl group preferably has 10 to 14 carbon atoms, and may be either a linear type or a branched type. Further, the alkyl chain may be either a saturated type or an unsaturated type. The polyglycerin (PG) refers to a trimer or higher order polymer of glycerin. In addition, the number of bonds between PG and an alkyl group is 1 (mono) to 3 (tri).

With respect to an HLB defined by the following formula, the polyglycerin-based nonionic surfactant preferably has an HLB in the range of 12 to 15.

$$HLB = (\text{Molecular weight of hydrophilic moiety in surfactant} / \text{Molecular weight of surfactant}) \times 20$$

Examples of an ester-type polyglycerin-based nonionic surfactant that is commonly available include PG(3) caprate (trade name: TEGOSOFT PC 31; Evonik Industries AG), PG(4) laurate (trade name: SY Glyster ML-310; Sakamoto Yakuhin Kogyo Co., Ltd.), PG(5) laurate (trade name: Sunsoft A-121E-C; Taiyo Kagaku Co., Ltd.), PG(6) laurate (trade name: SY Glyster ML-500; Sakamoto Yakuhin Kogyo Co., Ltd.), palm oil fatty acid PG(3) (trade name: EMALEX MCCG-3; Nihon Emulsion Co., Ltd.), PG(5) myristate (trade name: Sunsoft A-141E-C; Taiyo Kagaku Co., Ltd.), PG(6) myristate (trade name: NIKKOL Hexaglyn 1-M; Nikko Chemicals Co., Ltd.), PG(10) dimyristate (trade name: Sunsoft Q-142Y-C; Taiyo Kagaku Co., Ltd.), and the like. Examples of an ether type include PG(4) lauryl ether (trade name: ML04; Daicel Corporation, trade name: Sunether L-4; Taiyo Kagaku Co., Ltd.), PG(6) myristyl ether (trade name: MM06; Daicel Corporation), and the like. For example, in the notation such as PG(3) caprate, the numerical value in the parentheses, that is, "3" represents the number of moles of added polyglycerin.

[Glycerin: Component (C)]

The glycerin may be any as long as it can be used in a cosmetic, and includes synthetic glycerin produced by a synthesis method and natural glycerin produced by saponifying a naturally derived fat or oil. Since glycerin has a very high viscosity and is difficult to handle, there are those diluted with purified water to a concentration of 84% to 87% and those having a concentration of 95% or more. Examples of a commonly available product include 85% glycerin for cosmetics, concentrated glycerin for cosmetics (95% or more of glycerin), Japanese Pharmacopoeia glycerin, Japanese Pharmacopoeia concentrated glycerin, and the like. Among these, preferred glycerin is concentrated glycerin having a glycerin concentration of 95% or more. Glycerin is a main solvent for dispersing the hydrophobic powder, but a dimer or a trimer of glycerin may be mixed or replaced within a range that does not impair the dispersibility and fluidity of the hydrophobic powder. Examples thereof include diglycerin and triglycerin. When a dispersion is formed by mixing another aqueous component that can be dissolved in glycerin, for example, a component such as butylene glycol, pentylene glycol, hexylene glycol, or water in glycerin, the dispersibility of the hydrophobic powder deteriorates and also the viscosity of the dispersion increases.

The blending ratio of the glycerin dispersion is as follows: (A) hydrophobized inorganic powder coated with organic surface treatment agent/(B) hydrophilic polyglycerin-based nonionic surfactant having 10 to 14 carbon atoms/(C) glycerin=50.0 or more/10.0 or less/to 100.0 (wt %). It is preferably 50.0 or more/7.5 or less/to 100.0 (wt %), and more preferably 50.0 or more/less than 5.0/to 100.0 (wt %). The safety of the polyglycerin-based surfactant is relatively high, but when the surfactant having a molecular weight of 1000 or less is blended, the blending amount is preferably as small as possible from the viewpoint of irritation to the skin.

In the glycerin dispersion, a thickener, an antioxidant, an antibacterial preservative, a chelating agent, a pigment dispersant, a sensation improving agent, or the like can be appropriately blended as needed.

A method for producing the glycerin dispersion is not particularly limited, and the production may be performed by mixing the above-mentioned components. The mixing method is also not limited, and a usual method that enables uniform dispersion may be adopted. For example, an apparatus such as a disperser/kneader such as a ball mill, a bead mill, a wet jet mill, a homogenizer, a high-pressure homogenizer, a single-screw kneader, a twin-screw kneader, or a three-roll mill can be used.

By blending the glycerin dispersion in a cosmetic, a cosmetic having excellent sense of use, cosmetic finish, and cosmetic durability is provided.

In the cosmetic, the glycerin dispersion composition of the present invention can be blended in an amount of 0.1 wt % or more with respect to the total cosmetic, although it varies depending on the type and dosage form of the cosmetic. As the cosmetic in which the hydrophobized inorganic powder is blended, as a makeup cosmetic, a makeup base, a powder foundation, a liquid foundation, an oily foundation, a stick foundation, a pressed powder, a face powder, a white powder, a lipstick, a lipstick overcoat, a lip gloss, a concealer, a cheek color, an eye shadow, an eyebrow, an eyeliner, a mascara, an aqueous nail enamel, an oily nail enamel, an emulsion nail enamel, an enamel top coat, an enamel base coat, and the like, as a skin care cosmetic, an emollient cream, a cold cream, a whitening cream, a milky lotion, a toner lotion, a beauty essence serum, a facial pack, a carmine lotion, a liquid face wash, a face wash foam, a face wash cream, a face wash powder, a makeup cleansing, a body gloss, a sunscreen or suntan cream or lotion, and the like, as a hair cosmetic, a hair gloss, a hair cream, a hair shampoo, a hair rinse, a hair color, a hair brushing agent, and the like, as an antiperspirant, cream, lotion, powder, and spray-type deodorant products, and the like, as other cosmetics, a milky lotion, a soap, a bathing agent, a perfume, and the like can be exemplified.

Further, in the cosmetic, a pigment dispersant, an oil agent, a surfactant, a UV absorber, a preservative, an antioxidant, a film forming agent, a moisturizer, a thickener, a dye, a pigment, various chemicals, a fragrance, or the like, to be used for ordinary cosmetics or the like can be appropriately blended.

The glycerin dispersion is useful for blending the hydrophobic powder in the aqueous layer of a cosmetic. In the case of a powder-type cosmetic, almost no aqueous component is blended, but by blending glycerin, which is a moisturizer, the hydrophobic powder can be blended in the aqueous layer of the cosmetic. Further, in an emulsion-type cosmetic or an aqueous cosmetic, by blending the glycerin dispersion composition of the present invention in an aqueous layer component, it is possible to adjust the colorability and gloss, and impart a UV shielding function.

EXAMPLES

Hereinafter, the present invention will be described in detail with reference to preferred Examples and Comparative Examples corresponding to the Examples. The present invention is not limited to the following Examples, and modification, change, application (including partial one) and combination thereof can be made without deviating from the technical meaning of the present invention found from the following Examples.

[Preparation of Glycerin Dispersion]

Glycerin dispersions of Examples 1 to 22 and Comparative Examples 1 to 13 shown below were prepared.

Example 1

61.2 g of PG(5) myristate (Sunsoft A-141E-C; Taiyo Kagaku Co., Ltd.) and 18.8 g of phenoxyethanol (Microcare PE; Thor Japan Ltd.) were added to 670 g of glycerin (Triol VE; Kokyu Alcohol Kogyo Co., Ltd.) and dissolved at 60° C. The resulting solution was added to 3 kg of octyltriethoxysilane-treated hydrophobic pigment grade titanium oxide (trade name: ALT-TSR-10; Miyoshi Kasei, Inc.) and kneaded with a kneader mixer for 30 minutes, and then dispersed with a 3-roll mill, whereby a glycerin dispersion of Example 1 was obtained. The glycerin dispersion of Example 1 was a flowing highly viscous liquid.

Example 2

125 g of PG(5) myristate (Sunsoft A-141E-C; Taiyo Kagaku Co., Ltd.) and 27.3 g of phenoxyethanol (Microcare PE; Thor Japan Ltd.) were added to 2302.3 g of glycerin (Triol VE; Kokyu Alcohol Kogyo Co., Ltd.) and dissolved at 60° C. The resulting solution was added to 3 kg of octyltriethoxysilane-treated hydrophobic yellow iron oxide (trade name: ALT-YHP-10; Miyoshi Kasei, Inc.) and kneaded with a kneader mixer for 30 minutes, and then dispersed with a 3-roll mill, whereby a glycerin dispersion of Example 2 was obtained. The glycerin dispersion of Example 2 was a flowing highly viscous liquid.

Example 3

125 g of PG(5) myristate (Sunsoft A-141E-C; Taiyo Kagaku Co., Ltd.) and 27.3 g of phenoxyethanol (Microcare PE; Thor Japan Ltd.) were added to 2302.3 g of glycerin (Triol VE; Kokyu Alcohol Kogyo Co., Ltd.) and dissolved at 60° C. The resulting solution was added to 3 kg of octyltriethoxysilane-treated hydrophobic red iron oxide (trade name: ALT-MTRZ-10; Miyoshi Kasei, Inc.) and kneaded with a kneader mixer for 30 minutes, and then dispersed with a 3-roll mill, whereby a glycerin dispersion of Example 3 was obtained. The glycerin dispersion of Example 3 was a flowing highly viscous liquid.

Example 4

92.8 g of PG(5) myristate (Sunsoft A-141E-C; Taiyo Kagaku Co., Ltd.) and 23.1 g of phenoxyethanol (Microcare PE; Thor Japan Ltd.) were added to 1499.1 g of glycerin (Triol VE; Kokyu Alcohol Kogyo Co., Ltd.) and dissolved at 60° C. The resulting solution was added to 3 kg of octyltriethoxysilane-treated hydrophobic black iron oxide (trade name: ALT-BHP-10; Miyoshi Kasei, Inc.) and kneaded with a kneader mixer for 30 minutes, and then dispersed with a 3-roll mill, whereby a glycerin dispersion of Example 4 was obtained. The glycerin dispersion of Example 4 was a flowing highly viscous liquid.

Example 5

61.2 g of PG(4) lauryl ether (ML04; Daicel Corporation) and 20 g of phenoxyethanol (Microcare PE; Thor Japan Ltd.) were added to 918.8 g of glycerin (Triol VE; Kokyu Alcohol Kogyo Co., Ltd.) and dissolved at 60° C. The resulting solution was added to 3 kg of disodium stearoyl glutamate-treated hydrophobic pigment grade titanium oxide (trade name: NAI-TSR-10; Miyoshi Kasei, Inc.) and kneaded with a kneader mixer for 30 minutes, and then dispersed with a 3-roll mill, whereby a glycerin dispersion of Example 5 was obtained. The glycerin dispersion of Example 5 was a flowing highly viscous liquid.

Example 6

125 g of PG(4) lauryl ether (ML04; Daicel Corporation) and 27.3 g of phenoxyethanol (Microcare PE; Thor Japan Ltd.) were added to 2302.3 g of glycerin (Triol VE; Kokyu Alcohol Kogyo Co., Ltd.) and dissolved at 60° C. The resulting solution was added to 3 kg of disodium stearoyl glutamate-treated hydrophobic yellow iron oxide (trade name: NAI-YHP-10; Miyoshi Kasei, Inc.) and kneaded with a kneader mixer for 30 minutes, and then dispersed with a 3-roll mill, whereby a glycerin dispersion of Example 6 was obtained. The glycerin dispersion of Example 6 was a flowing highly viscous liquid.

Example 7

125 g of PG(4) lauryl ether (ML04; Daicel Corporation) and 27.3 g of phenoxyethanol (Microcare PE; Thor Japan Ltd.) were added to 2302.3 g of glycerin (Triol VE; Kokyu Alcohol Kogyo Co., Ltd.) and dissolved at 60° C. The resulting solution was added to 3 kg of disodium stearoyl glutamate-treated hydrophobic red iron oxide (trade name: NAI-RHP-10; Miyoshi Kasei, Inc.) and kneaded with a kneader mixer for 30 minutes, and then dispersed with a 3-roll mill, whereby a glycerin dispersion of Example 7 was obtained. The glycerin dispersion of Example 7 was a flowing highly viscous liquid.

Example 8

92.8 g of PG(4) lauryl ether (ML04; Daicel Corporation) and 25 g of phenoxyethanol (Microcare PE; Thor Japan Ltd.) were added to 1882.2 g of glycerin (Triol VE; Kokyu Alcohol Kogyo Co., Ltd.) and dissolved at 60° C. The resulting solution was added to 3 kg of disodium stearoyl glutamate-treated hydrophobic black iron oxide (trade name: NAI-BHP-10; Miyoshi Kasei, Inc.) and kneaded with a kneader mixer for 30 minutes, and then dispersed with a 3-roll mill, whereby a glycerin dispersion of Example 8 was obtained. The glycerin dispersion of Example 8 was a flowing highly viscous liquid.

Example 9

191.5 g of PG(5) myristate (Sunsoft A-141E-C; Taiyo Kagaku Co., Ltd.) and 30 g of phenoxyethanol (Microcare PE; Thor Japan Ltd.) were added to 2778.5 g of glycerin (Triol VE; Kokyu Alcohol Kogyo Co., Ltd.) and dissolved at 60° C. The resulting solution was added to 3 kg of dimethylpolysiloxane-hydrogen dimethicone duplex treated hydrophobic fine particle titanium oxide (trade name: SAS-UT-A30; Miyoshi Kasei, Inc.) and kneaded with a kneader mixer for 30 minutes, and then dispersed with a 3-roll mill, whereby a glycerin dispersion of Example 9 was obtained. The glycerin dispersion of Example 9 was a flowing highly viscous liquid.

Example 10

191.5 g of PG(5) myristate (Sunsoft A-141E-C; Taiyo Kagaku Co., Ltd.) and 30 g of phenoxyethanol (Microcare PE; Thor Japan Ltd.) were added to 2778.5 g of glycerin (Triol VE; Kokyu Alcohol Kogyo Co., Ltd.) and dissolved at 60° C. The resulting solution was added to 3 kg of hydrogen dimethicone-treated hydrophobic fine particle titanium oxide (trade name: SI-UT-A55; Miyoshi Kasei, Inc.) and kneaded with a kneader mixer for 30 minutes, and then dispersed with a 3-roll mill, whereby a glycerin dispersion of Example 10 was obtained. The glycerin dispersion of Example 10 was a flowing highly viscous liquid.

Example 11

191.5 g of PG(5) myristate (Sunsoft A-141E-C; Taiyo Kagaku Co., Ltd.) and 30 g of phenoxyethanol (Microcare PE; Thor Japan Ltd.) were added to 2778.5 g of glycerin (Triol VE; Kokyu Alcohol Kogyo Co., Ltd.) and dissolved at 60° C. The resulting solution was added to 3 kg of disodium stearoyl glutamate-treated hydrophobic fine particle titanium oxide (trade name: NAI-Z-300; Miyoshi Kasei, Inc.) and kneaded with a kneader mixer for 30 minutes, and then dispersed with a 3-roll mill, whereby a glycerin dispersion of Example 11 was obtained. The glycerin dispersion of Example 11 was a flowing highly viscous liquid.

Example 12

157.9 g of PG(5) myristate (Sunsoft A-141E-C; Taiyo Kagaku Co., Ltd.) and 25 g of phenoxyethanol (Microcare PE; Thor Japan Ltd.) were added to 1817.1 g of glycerin (Triol VE; Kokyu Alcohol Kogyo Co., Ltd.) and dissolved at 60° C. The resulting solution was added to 3 kg of dimethicone-octyltriethoxysilane duplex treated hydrophobic fine particle titanium oxide (trade name: SALT-MZ-500; Miyoshi Kasei, Inc.) and kneaded with a kneader mixer for 30 minutes, and then dispersed with a 3-roll mill, whereby a glycerin dispersion of Example 12 was obtained. The glycerin dispersion of Example 12 was a flowing highly viscous liquid.

Example 13

157.9 g of PG(5) laurate (Sunsoft A-121E-C; Taiyo Kagaku Co., Ltd.) and 25 g of phenoxyethanol (Microcare PE; Thor Japan Ltd.) were added to 1817.1 g of glycerin (Triol VE; Kokyu Alcohol Kogyo Co., Ltd.) and dissolved at 60° C. The resulting solution was added to 3 kg of isostearic acid-treated hydrophobic fine particle zinc oxide (trade name: MZY-505EX; Tayca Corporation) and kneaded with a kneader mixer for 30 minutes, and then dispersed with a 3-roll mill, whereby a glycerin dispersion of Example 13 was obtained. The glycerin dispersion of Example 13 was a flowing highly viscous liquid.

Example 14

191.5 g of PG(5) myristate (Sunsoft A-141E-C; Taiyo Kagaku Co., Ltd.) and 25 g of phenoxyethanol (Microcare PE; Thor Japan Ltd.) were added to 1817 g of glycerin (Triol VE; Kokyu Alcohol Kogyo Co., Ltd.) and dissolved at 60° C. The resulting solution was added to 3 kg of alkylsilane-treated hydrophobic fine particle titanium oxide (trade name: STR-40 OTS; Sakai Chemical Industry Co., Ltd.) and kneaded with a kneader mixer for 30 minutes, and then dispersed with a 3-roll mill, whereby a glycerin dispersion of Example 14 was obtained. The glycerin dispersion of Example 14 was a flowing highly viscous liquid.

Example 15

A glycerin dispersion of Example 15 was obtained in the same manner as in Example 1 except that PG(5) myristate in Example 1 was changed to PG(3) caprate (TEGOSOFT PC-31; Evonik Industries AG). The glycerin dispersion of Example 15 was a flowing highly viscous liquid.

Example 16

A glycerin dispersion of Example 16 was obtained in the same manner as in Example 1 except that PG(5) myristate in Example 1 was changed to PG(6) myristate (HEXAGLYN 1-M; Nikko Chemicals Co., Ltd.). The glycerin dispersion of Example 16 was a flowing highly viscous liquid.

Example 17

A glycerin dispersion of Example 17 was obtained in the same manner as in Example 1 except that PG(5) myristate in Example 1 was changed to PG(10) dimyristate (Sunsoft Q-142Y-C; Taiyo Kagaku Co., Ltd.). The glycerin dispersion of Example 17 was a flowing highly viscous liquid.

Example 18

A glycerin dispersion of Example 18 was obtained in the same manner as in Example 1 except that PG(5) myristate in Example 1 was changed to PG(10) trilaurate (Sunsoft Q-123Y-C; Taiyo Kagaku Co., Ltd.). The glycerin dispersion of Example 18 was a flowing highly viscous liquid.

Example 19

A glycerin dispersion of Example 19 was obtained in the same manner as in Example 1 except that titanium oxide in Example 1 was changed to isostearyl sebacate-disodium stearoyl glutamate duplex treated hydrophobic pigment grade titanium oxide (trade name: NHS-TSR-10; Miyoshi Kasei, Inc.) and further PG(5) myristate was changed to palm oil fatty acid PG(3) (EMALEX MCCG-3; Nihon Emulsion Co., Ltd.). The glycerin dispersion of Example 19 was a flowing highly viscous liquid.

Example 20

A glycerin dispersion of Example 20 was obtained in the same manner as in Example 19 except that titanium oxide in Example 19 was changed to hydrogenated soy lecithin-treated hydrophobic pigment grade titanium oxide (trade name: NLI-TSR-10; Miyoshi Kasei, Inc.). The glycerin dispersion of Example 20 was a flowing highly viscous liquid.

Example 21

A glycerin dispersion of Example 21 was obtained in the same manner as in Example 20 except that titanium oxide in Example 20 was changed to dimethylpolysiloxane-disodium stearoyl glutamate duplex treated hydrophobic pigment grade titanium oxide (trade name: SA/NAI-TSR-10; Miyoshi Kasei, Inc.). The glycerin dispersion of Example 21 was a flowing highly viscous liquid.

Example 22

A glycerin dispersion of Example 22 was obtained in the same manner as in Example 1 except that glycerin in Example 1 was changed to diglycerin (UNIGLY G-2; NOF Corporation). The glycerin dispersion of Example 22 was a flowing highly viscous liquid.

Comparative Example 1

61.2 g of PG(10) palmitate (DECAGLYN 1-PVEX; Nikko Chemical Co., Ltd.) and 21.4 g of phenoxyethanol (Microcare PE; Thor Japan Ltd.) were added to 1203.1 g of glycerin (Triol VE; Kokyu Alcohol Kogyo Co., Ltd.) and dissolved at 60° C. The resulting solution was added to 3 kg of octyltriethoxysilane-treated hydrophobic pigment grade titanium oxide (trade name: ALT-TSR-10; Miyoshi Kasei, Inc.) and kneaded with a kneader mixer, and then dispersed with a 3-roll mill. The obtained glycerin dispersion of Comparative Example 1 was in a solid form.

Comparative Example 2

The same procedure was performed except that PG(10) palmitate in Comparative Example 1 was changed to PG(10) isostearate (DECAGLYN 1-ISV; Nikko Chemical Co., Ltd.). The obtained glycerin dispersion of Comparative Example 2 was in a solid form.

Comparative Example 3

The same procedure was performed except that PG (10) palmitate in Comparative Example 1 was changed to PG (10) diisostearate (trade name: EMALEX GWIS-210EX; Nihon Emulsion Co., Ltd.). The obtained glycerin dispersion of Comparative Example 3 was in a solid form.

Comparative Example 4

The same procedure was performed except that PG(10) palmitate in Comparative Example 1 was changed to PG(10) dipalmitate (Polyaldo 10-2-P; Lonza Co., Ltd.). The obtained glycerin dispersion of Comparative Example 4 was in a solid form.

Comparative Example 5

The same procedure was performed except that PG(10) palmitate in Comparative Example 1 was changed to PG(10) dioleate (Sunsoft Q-172Y-C; Taiyo Kagaku Co., Ltd.). The obtained glycerin dispersion of Comparative Example 5 was in a solid form.

Comparative Example 6

The same procedure was performed except that PG(10) palmitate in Comparative Example 1 was changed to PG(6) distearate (Sunsoft Q-182Y-C; Taiyo Kagaku Co., Ltd.). The obtained glycerin dispersion of Comparative Example 6 was in a solid form.

Comparative Example 7

The same procedure was performed except that PG(10) palmitate in Comparative Example 1 was changed to PG(10) tristearate (EMALEX TSG-10; Nihon Emulsion Co., Ltd.). The obtained glycerin dispersion of Comparative Example 7 was in a solid form.

Comparative Example 8

61.2 g of PG(5) myristate (Sunsoft A-141E-C; Taiyo Kagaku Co., Ltd.) and 21.4 g of phenoxyethanol (Microcare PE; Thor Japan Ltd.) were added to 1203.1 g of 1,3-butylene glycol (HAISUGARCANE BG; Kokyu Alcohol Kogyo Co., Ltd.) and dissolved at 60° C. The resulting solution was added to 3 kg of octyltriethoxysilane-treated hydrophobic pigment grade titanium oxide (trade name: ALT-TSR-10; Miyoshi Kasei, Inc.) and kneaded with a kneader mixer, and then dispersed with a 3-roll mill. The obtained dispersion of Comparative Example 8 was in a solid form.

Comparative Example 9

The procedure was performed in the same manner as in Comparative Example 8 except that PG(5) myristate in Comparative Example 8 was changed to polyglyceryl(4) lauryl ether (ML04; Daicel Corporation). The obtained dispersion of Comparative Example 9 was in a solid form.

Comparative Example 10

The procedure was performed in the same manner as in Example 9 except that glycerin in Example 9 was changed to 1,3-butylene glycol (HAISUGARCANE BG; Kokyu Alcohol Kogyo Co., Ltd.). The obtained dispersion of Comparative Example 10 was in a solid form.

Comparative Example 11

The procedure was performed in the same manner as in Comparative Example 10 except that PG(5) myristate in Comparative Example 10 was changed to polyglyceryl(4) lauryl ether (ML04; Daicel Corporation). The obtained dispersion of Comparative Example 11 was in a solid form.

Comparative Example 12

The procedure was performed in the same manner as in Example 12 except that glycerin in Example 12 was changed to 1,3-butylene glycol (HAISUGARCANE BG; Kokyu Alcohol Kogyo Co., Ltd.). The obtained dispersion of Comparative Example 12 was in a solid form.

Comparative Example 13

The procedure was performed in the same manner as in Comparative Example 12 except that PG(5) myristate in Comparative Example 12 was changed to polyglyceryl(4) lauryl ether (ML04; Daicel Corporation). The obtained dispersion of Comparative Example 13 was in a solid form.

The following Table 1 is a list of the compositions of the glycerin dispersions of Examples 1 to 22 and Comparative Examples 1 to 13.

TABLE 1

| | Component (A) Hydrophobized inorganic powder | Component (B) PG-based nonionic surfactant | Component (C) Dispersion medium | Ratios of respective components (wt %) (A)/(B)/(C) |
|---|---|---|---|---|
| Example 1 | ALT-TSR-10 | PG(5) myristate | glycerin | 80/1.6/18.4 |
| Example 2 | ALT-YHP-10 | PG(5) myristate | glycerin | 55/2.3/42.2 |
| Example 3 | ALT-MTRZ-10 | PG(5) myristate | glycerin | 55/2.3/42.2 |
| Example 4 | ALT-BHP-10 | PG(5) myristate | glycerin | 65/2/33 |
| Example 5 | NAI-TSR-10 | PG(4) lauryl ether | glycerin | 75/1.5/23.5 |
| Example 6 | NAI-YHP-10 | PG(4) lauryl ether | glycerin | 55/2.3/42.2 |
| Example 7 | NAI-RHP-10 | PG(4) lauryl ether | glycerin | 55/2.3/42.2 |
| Example 8 | NAI-BHP-10 | PG(4) lauryl ether | glycerin | 60/1.9/38.1 |
| Example 9 | SAS-UT-A30 | PG(5) myristate | glycerin | 50/3.2/46.3 |
| Example 10 | SI-UT-A55 | PG(5) myristate | glycerin | 50/3.2/46.8 |
| Example 11 | NAI-Z-300 | PG(5) myristate | glycerin | 50/3.2/46.8 |
| Example 12 | SALT-MZ-500 | PG(5) myristate | glycerin | 60/3.2/36.8 |
| Example 13 | MZY-505EX | PG(5) laurate | glycerin | 60/3.2/36.8 |
| Example 14 | STR-40-OTS | PG(5) myristate | glycerin | 50/3.2/46.3 |
| Example 15 | ALT-TSR-10 | PG(3) caprate | glycerin | 80/1.6/18.4 |
| Example 16 | ALT-TSR-10 | PG(6) myristate | glycerin | 80/1.6/18.4 |
| Example 17 | ALT-TSR-10 | PG(10) dimyristate | glycerin | 80/1.6/18.4 |
| Example 18 | ALT-TSR-10 | PG(10) trilaurate | glycerin | 80/1.6/18.4 |
| Example 19 | NHS-TSR-10 | palm oil fatty acid PG(3) | glycerin | 80/1.6/18.4 |
| Example 20 | NLI-TSR-10 | palm oil fatty acid PG(3) | glycerin | 80/1.6/18.4 |
| Example 21 | SA/NAI-TSR-10 | palm oil fatty acid PG(3) | glycerin | 80/1.6/18.4 |
| Example 22 | ALT-TSR-10 | PG(5) myristate | glycerin | 80/1.6/18.4 |
| Comparative Example 1 | ALT-TSR-10 | PG(10) palmitate | glycerin | 70/1.5/28.9 |
| Comparative Example 2 | ALT-TSR-10 | PG(10) isostearate | glycerin | 70/1.5/28.9 |
| Comparative Example 3 | ALT-TSR-10 | PG(10) diisostearate | glycerin | 70/1.5/28.9 |
| Comparative Example 4 | ALT-TSR-10 | PG(10) dipalmitate | glycerin | 70/1.5/28.9 |
| Comparative Example 5 | ALT-TSR-10 | PG(10) dioleate | glycerin | 70/1.5/28.9 |
| Comparative Example 6 | ALT-TSR-10 | PG(6) distearate | glycerin | 70/1.5/28.9 |
| Comparative Example 7 | ALT-TSR-10 | PG(10) tristearate | glycerin | 70/1.5/28.9 |
| Comparative Example 8 | ALT-TSR-10 | PG(5) myristate | BG | 70/1.5/28.9 |
| Comparative Example 9 | ALT-TSR-10 | PG(4) lauryl ether | BG | 70/1.5/28.9 |
| Comparative Example 10 | SAS-UT-A30 | PG(5) myristate | BG | 50/3.2/46.3 |
| Comparative Example 11 | SAS-UT-A30 | PG(4) lauryl ether | BG | 50/3.2/46.3 |
| Comparative Example 12 | SALT-MZ-500 | PG(5) myristate | BG | 60/3.2/36.8 |
| Comparative Example 13 | SALT-MZ-500 | PG(4) lauryl ether | BG | 60/3.2/36.8 |

[Viscosity, Dispersibility, and Stability Over Time of Glycerin Dispersion]

With respect to the glycerin dispersions of Examples 1 to 22 and Comparative Examples 1 to 13, the viscosity, dispersibility, and stability over time were evaluated.

(Evaluation of Viscosity)

With respect to the glycerin dispersion immediately after production, the viscosity was measured using a BH type rotational viscometer (Brookfield, Inc.) under the conditions of 25° C. using No. 4 rotor at 1.5 rpm/60 sec and 3 rpm/60 sec (4V1.5/4V3).

(Evaluation of Dispersibility)

5.0 g of the glycerin dispersion was taken in a 200 cc glass beaker, and ion exchanged water was added thereto until the total amount reached 100 g. The mixed liquid was dispersed with a disper mixer at 1400 rpm/minute. 1 g of the dispersion liquid was taken with a dropper and dropped in the middle of a qualitative filter paper No. 2 (150 mm φ: Advantech Co., Ltd.) and soaked in the filter paper. After 1 minute, it was evaluated whether or not a grain was observed on the filter paper. The opening of the qualitative filter paper No. 2 is about 10 μm. The evaluation criteria are shown below.
O: No grains are observed.
×: A grain is observed.

(Stability Test Over Time)

In a 100 mL wide mouth bottle (made of PP, trade name: Iboy), 150 g of the glycerin dispersion was placed, and the bottle was covered with a lid, thereby preparing a sample. The sample was placed in a thermostat bath at 50° C. for 2 weeks, then taken out and left at normal temperature for 1 day, and the appearance and properties of the sample thereafter were evaluated. With respect to the appearance, it was evaluated whether or not liquid separation occurred and whether or not a precipitate was formed on the bottom of the bottle by visual observation. With respect to the properties, a precipitate was touched with a spatula and it was evaluated whether or not the precipitate was hardened and caked. The evaluation criteria are shown below.
O: Liquid separation or precipitation is not observed.
×: Liquid separation is observed in the upper layer. Alternatively, a precipitate is hardened and caked.

In the following Table 2, the evaluation results of the viscosity, dispersibility, and stability over time of the glycerin dispersions of Examples 1 to 22 and Comparative Examples 1 to 13 are shown.

TABLE 2

|  | Viscosity (4V1.5/4V3) | Dispersibility test | Stability over time (50° C./2 weeks) |
| --- | --- | --- | --- |
| Example 1 | 9850/7680 | O | O |
| Example 2 | 11340/10050 | O | O |
| Example 3 | 18560/16350 | O | O |
| Example 4 | 57930/51000 | O | O |
| Example 5 | 13900/10270 | O | O |
| Example 6 | 15870/12750 | O | O |
| Example 7 | 12500/10020 | O | O |
| Example 8 | 76400/71840 | O | O |
| Example 9 | 7320/6450 | O | O |
| Example 10 | 20550/17600 | O | O |
| Example 11 | 43750/40120 | O | O |
| Example 12 | 7540/6610 | O | O |
| Example 13 | 7710/7060 | O | O |
| Example 14 | 18300/16200 | O | O |
| Example 15 | 8550/7180 | O | O |
| Example 16 | 11500/9390 | O | O |
| Example 17 | 14150/12600 | O | O |
| Example 18 | 13400/11350 | O | O |
| Example 19 | 11550/8450 | O | O |
| Example 20 | 10050/8900 | O | O |
| Example 21 | 7530/6630 | O | O |
| Example 22 | 13700/11300 | O | O |
| Comparative Example 1 | <400000/<200000 | x | x |
| Comparative Example 2 | <400000/<200000 | x | x |
| Comparative Example 3 | <400000/<200000 | x | x |
| Comparative Example 4 | <400000/<200000 | x | x |
| Comparative Example 5 | <400000/<200000 | x | x |
| Comparative Example 6 | <400000/<200000 | x | x |
| Comparative Example 7 | <400000/<200000 | x | x |
| Comparative Example 8 | <400000/<200000 | x | x |
| Comparative Example 9 | <400000/<200000 | x | x |
| Comparative Example 10 | <400000/<200000 | x | x |
| Comparative Example 11 | <400000/<200000 | x | x |
| Comparative Example 12 | <400000/<200000 | x | x |
| Comparative Example 13 | <400000/<200000 | x | x |

(Discussion of Evaluation Results)

From the evaluation results of Example 1 (dispersion medium: glycerin), Example 22 (dispersion medium: diglycerin), and Comparative Example 8 (dispersion medium: butylene glycol), it was found that when glycerin or diglycerin was used as the dispersion medium, the viscosity, dispersibility, and stability over time are excellent as compared with the case where butylene glycol was used as the dispersion medium.

In addition, excellent viscosity, dispersibility, and stability over time are achieved also in Examples 1 to 4, 9 to 12, 14, 16, and 22 (PG(5) myristate: 14 carbon atoms), Examples 5 to 8 (PG(4) lauryl ether: 12 carbon atoms), Example 13 (PG(5) laurate: 12 carbon atoms), Example 15 (PG(3) caprate: 10 carbon atoms), and Examples 19 to 21 (palm oil fatty acid PG(3): 8 to 18 carbon atoms, mainly composed of 12 carbon atoms), and therefore, it was found that the alkyl group in the PG-based nonionic surfactant preferably has 10 to 14 carbon atoms. Further, from the evaluation results of Example 17 (the number of attached alkyl groups: 2) and Example 18 (the number of attached alkyl groups: 3), excellent viscosity, dispersibility, and stability over time are achieved regardless of the number of attached alkyl groups.

On the other hand, from Comparative Example 1 (PG(10) palmitate: 16 carbon atoms), Comparative Example 2 (PG (10) isostearate: 18 carbon atoms), and the like, in the case where the alkyl group in the PG-based nonionic surfactant has 16 or more carbon atoms, the viscosity, dispersibility, and stability over time were poor as compared with the case where the alkyl group has 10 to 14 carbon atoms.

It was also found that as in Examples 1, and 15 to 22, in the glycerin dispersion of the present invention, the hydrophobized inorganic powder could be blended at a high concentration, in particular, in an amount of 50 wt % or more.

Further, the glycerin dispersions of Examples 1 to 22 were flowing highly viscous liquids, whereas the glycerin dispersions of Comparative Examples 1 to 13 were in a solid form. That is, the glycerin dispersions of Examples 1 to 22 were sticky liquids, but had better handleability than the glycerin dispersions of Comparative Examples 1 to 13 in a solid form obtained by blending a hydrophobized powder at a high concentration.

[Cosmetic Obtained by Blending Glycerin Dispersion]

Next, the following cosmetics were prepared and evaluated for the sense of use, cosmetic effect, and cosmetic durability. The sense of use, cosmetic effect, and cosmetic durability were evaluated based on the average of scores given by 25 expert panelists who were asked to use each cosmetic for one day and score on a five-point scale shown below. The sense of use is evaluated in terms of good smoothness, no stickiness, and comfort. Further, the cosmetic effect is evaluated in terms of powderiness, no uneven coating, uniformity of the cosmetic film, and natural luster. Further, the cosmetic durability is evaluated in terms of occurrence of color dullness or shininess with the passage of time, and no powder aggregation.

Example 23: O/W-Type Emulsion Foundation

TABLE 3

| | Components | Example 23 |
|---|---|---|
| Oil layer components | Isohexadecane | 15.0 (wt %) |
| | Trimethylolpropane triisostearate | 6.5 |
| | 2-Ethylhexyl p-methoxycinnamate | 5.0 |
| | Cetyl alcohol | 1.5 |
| Aqueous layer components | Glycerin dispersion of Example 1 (titanium oxide) | 10.0 |
| | Glycerin dispersion of Example 2 (yellow iron oxide) | 5.6 |
| | Glycerin dispersion of Example 3 (red iron oxide) | 3.8 |
| | Glycerin dispersion of Example 4 (black iron oxide) | 0.3 |
| | BG | 3.0 |
| | Carbomer | 0.2 |
| | Triethanolamine | 0.1 |
| | Phenoxyethanol | 0.5 |
| | Ion exchanged water | Balance |

(Production Method)

A: The oil layer components were well dispersed and mixed.

B: The aqueous layer components were well dispersed and mixed.

C: A was added to B, and the resultant was emulsified with a homomixer, whereby an O/W-type emulsion foundation was obtained.

The O/W-type emulsion foundation obtained by blending the glycerin dispersion of the present invention had good sense of use, cosmetic effect, and cosmetic durability.

Example 24: Water-Based Suncut Lotion

TABLE 4

| | Components | Example 24 |
|---|---|---|
| Oil layer components | Decamethylcyclopentasiloxane | 20.0 (wt %) |
| | Dimethylpolysiloxane (6 cs) | 4.5 |
| | Neopentyl glycol diethylhexanoate | 5.5 |

TABLE 4-continued

| | Components | Example 24 |
|---|---|---|
| Aqueous layer components | Glycerin dispersion of Example 9 (titanium oxide) | 12.0 |
| | Glycerin dispersion of Example 13 (zinc oxide) | 20.0 |
| | PEG-11 methyl ether dimethicone | 3.0 |
| | Glyceryl monostearate | 1.0 |
| | BG | 3.0 |
| | Ethanol | 5.0 |
| | Purified water | Balance |

(Production Method)

A: The oil layer components were well dispersed and mixed.

B: The aqueous layer components were well dispersed and mixed.

C: A was added to B, and the resultant was emulsified with a homomixer, whereby a water-based suncut lotion was obtained.

The water-based suncut lotion obtained by blending the glycerin dispersion of the present invention had good sense of use, cosmetic effect, and cosmetic durability.

Example 25: O/W-Type Sunscreen Cosmetic

TABLE 5

| | Components | Example 25 |
|---|---|---|
| Oil layer components | Tridecane | 12.5 |
| | Glyceryl octanoate | 5.0 |
| | Dimethylpoly siloxane (6 cs) | 3.0 |
| | Stearyl alcohol | 1.0 |
| | 2-Ethylhexyl p-methoxycinnamate | 5.0 |
| Aqueous layer components | Glycerin dispersion of Example 10 (titanium oxide) | 9.0 |
| | Glycerin dispersion of Example 13 (zinc oxide) | 12.0 |
| | PEG-80 hydrogenated castor oil | 1.0 |
| | Acrylate/sodium acryloyldimethyltaurate copolymer | 0.2 |
| | Xanthan gum | 0.1 |
| | Phenoxyethanol | 0.5 |
| | Ethanol | 3.0 |
| | Purified water | Balance |

(Production Method)

A: The oil layer components were well dispersed and mixed.

B: The aqueous layer components were well dispersed and mixed.

C: A was added to B, and the resultant was emulsified with a homomixer, whereby an O/W-type sunscreen cosmetic was obtained.

The O/W-type sunscreen cosmetic obtained by blending the glycerin dispersion of the present invention had good sense of use, cosmetic effect, and cosmetic durability.

Example 26: Powder Foundation

TABLE 6

| | Components | Example 26 |
|---|---|---|
| Powder components | Stearoyl glutamate-treated sericite | 25.0 (wt %) |
| | Stearoyl glutamate-treated talc | 55.0 |
| | Dimethicone-treated silica beads | 5.0 |
| | Silicone rubber powder | 1.0 |

TABLE 6-continued

| | Components | Example 26 |
|---|---|---|
| Oil layer components | Polyglyceryl-2 monoisostearate | 0.5 |
| | 2-Ethylhexyl p-methoxycinnamate | 3.0 |
| | Isotridecyl isononanoate | 2.5 |
| Aqueous layer components | Glycerin dispersion of Example 19 (titanium oxide) | 10.0 |
| | Glycerin dispersion of Example 6 (yellow iron oxide) | 5.4 |
| | Glycerin dispersion of Example 7 (red iron oxide) | 3.5 |
| | Glycerin dispersion of Example 8 (black iron oxide) | 0.3 |
| | Glycerin dispersion of Example 14 (titanium oxide) | 7.5 |
| | Ion exchanged water | Balance |

(Production Method)

A: The powder components and the oil layer components were well dispersed and mixed.

B: The aqueous layer components were well dispersed and mixed.

C: A was added to B, and the resultant is formed into a slurry.

D: A metal plate was filled with C, a water absorption sheet was placed on the surface, and suction compression molding was performed using a porous suction head.

E: D was left overnight in a thermostat bath at 70° C., and purified water was completely removed, whereby a powder foundation was obtained.

The powder foundation obtained by blending the glycerin dispersion of the present invention had good sense of use, cosmetic effect, and cosmetic durability.

Example 27: Water-Based White Powder Foundation

TABLE 7

| | Components | Example 27 |
|---|---|---|
| Powder components | Talc | 13.0 (wt %) |
| | Boron nitride | 3.0 |
| | Synthetic mica | 3.5 |
| | Polyurethane powder | 3.0 |
| Aqueous layer components | Glycerin dispersion of Example 20 (titanium oxide) | 5.0 |
| | BG | 5.0 |
| | Ethanol | 5.0 |
| | EDTA·2Na | 0.2 |
| | Phenoxyethanol | 0.3 |
| | SEPINOV P88 | 0.2 |
| | Ion exchanged water | Balance |

(Production Method)

A: The powder components were well mixed.

B: The aqueous layer components were mixed and dissolved.

C: A was added to B, and the resultant was well stirred, whereby a water-based white powder foundation was obtained.

The water-based white powder foundation obtained by blending the glycerin dispersion of the present invention had good sense of use, cosmetic effect, and cosmetic durability.

Example 28: Water-Based Eye Shadow

TABLE 8

| | Components | Example 28 |
|---|---|---|
| Powder components | Talc | 5.0 (wt %) |
| | Pearl pigment | 20.0 |
| | Lauroyl lysine | 1.5 |
| | Polyurethane powder | 4.0 |
| Aqueous layer components | BG | 5.0 |
| | Glycerin dispersion of Example 6 (yellow iron oxide) | 1.5 |
| | Glycerin dispersion of Example 7 (red iron oxide) | 0.6 |
| | Glycerin dispersion of Example 8 (black iron oxide) | 0.3 |
| | Ethanol | 5.0 |
| | EDTA·2Na | 0.2 |
| | Citric acid | 0.03 |
| | Sodium citrate | 0.12 |
| | Phenoxyethanol | 0.3 |
| | SEPINOV P88 | 0.2 |
| | Ion exchanged water | Balance |

(Production Method)

A: The powder components were well mixed.

B: The aqueous layer components were mixed and dissolved.

C: A was added to B, and the resultant was well stirred, whereby a water-based eye shadow was obtained.

The water-based eye shadow obtained by blending the glycerin dispersion of the present invention had good sense of use, cosmetic effect, and cosmetic durability.

Example 29: Water-Based Makeup Base

TABLE 9

| | Components | Example 29 |
|---|---|---|
| Powder components | Lecithin-treated mica | 5.0 (wt %) |
| Aqueous layer components | Glycerin dispersion of Example 2 (yellow iron oxide) | 1.3 |
| | Glycerin dispersion of Example 3 (red iron oxide) | 0.5 |
| | Glycerin dispersion of Example 4 (black iron oxide) | 0.3 |
| | BG | 10.0 |
| | Glycerin | 3.0 |
| | Ethanol | 5.0 |
| | EDTA·3Na | 0.2 |
| | Phenoxyethanol | 0.3 |
| | Ion exchanged water | Balance |

(Production Method)

A: The powder component was well mixed.

B: BG of the aqueous layer component and the component A were mixed and treated with a roller.

C: A was added to B, and the resultant was well stirred, whereby a water-based makeup base was obtained.

The water-based makeup base obtained by blending the glycerin dispersion of the present invention had good sense of use, cosmetic effect, and cosmetic durability.

Example 30: Lipstick

TABLE 10

| | Components | Example 30 |
|---|---|---|
| Oil layer components | Dextrin palmitate/ethylhexanoate | 9.0 (wt %) |
| | Isotridecyl myristate | 15.0 |
| | PEG-9 polydimethylsiloxyethyl dimethicone | 3.5 |
| | Tridecane | 40.0 |
| Powder component | Bentonite | 0.8 |
| Aqueous layer components | Glycerin dispersion of Example 21 (titanium oxide) | 3.5 |
| | Glycerin dispersion of Example 7 (red iron oxide) | 0.7 |
| | BG | 5.0 |
| | Sodium chloride | 0.5 |
| | Purified water | Balance |

(Production Method)

A: The oil layer components were well mixed.

B: The powder component was mixed with the component A, and the resultant was well dispersed with a homomixer.

C: B was added to A, and the resultant was uniformly mixed.

D: The aqueous layer components were mixed and heated.

E: D was added to C, and the resultant was emulsified, whereby a lipstick was obtained.

The lipstick obtained by blending the glycerin dispersion of the present invention had good sense of use, cosmetic effect, and cosmetic durability.

Example 31: Antiperspirant

TABLE 11

| | Components | Example 31 |
|---|---|---|
| Powder component | Talc | 7.5 (wt %) |
| | Polymethylsilsesquioxane | 6.0 |

TABLE 11-continued

| | Components | Example 31 |
|---|---|---|
| Aqueous layer components | Glycerin dispersion of Example 13 (zinc oxide) | 4.5 |
| | Sodium chloride | 0.1 |
| | Ethanol | 30.0 |
| | BG | 3.0 |
| | Polyoxyethylene sorbitan monolaurate | 0.2 |
| | Phenoxyethanol | 0.3 |
| | Ion exchanged water | Balance |

(Production Method)

A: The powder components were well mixed.

B: The aqueous layer components were mixed and dissolved.

C: A was added to B, and the resultant was mixed, whereby an antiperspirant was obtained.

The antiperspirant obtained by blending the glycerin dispersion of the present invention had good sense of use, cosmetic effect, and cosmetic durability.

The invention claimed is:

1. A glycerin dispersion, comprising:
a hydrophobized inorganic powder, in which an inorganic powder is used as a base and hydrophobicity is imparted by coating the inorganic powder with an organic surface treatment agent;
a polyglycerin-based nonionic surfactant; and
glycerin;
wherein an alkyl group in the polyglycerin-based nonionic surfactant has 10 to 14 carbon atoms, and the content of the hydrophobized inorganic powder is 50 wt % or more.

2. The glycerin dispersion according to claim 1 wherein the organic surface treatment agent is one or more types of compounds selected from a silicone compound, an alkyl silane, an alkyl titanate, an acylated amino acid, a fatty acid, lecithin, an ester oil, an acrylic polymer, and a urethane polymer.

3. A cosmetic, comprising the glycerin dispersion according to claim 1 as an aqueous layer component.

4. A cosmetic, comprising the glycerin dispersion according to claim 2 as an aqueous layer component.

* * * * *